May 23, 1944.　　　G. R. ANDERSON　　　2,349,329
CONTROL SYSTEM
Filed June 22, 1942　　　4 Sheets-Sheet 1

George R. Anderson
INVENTOR
BY Gerald B. Tjoflat
his ATTORNEY

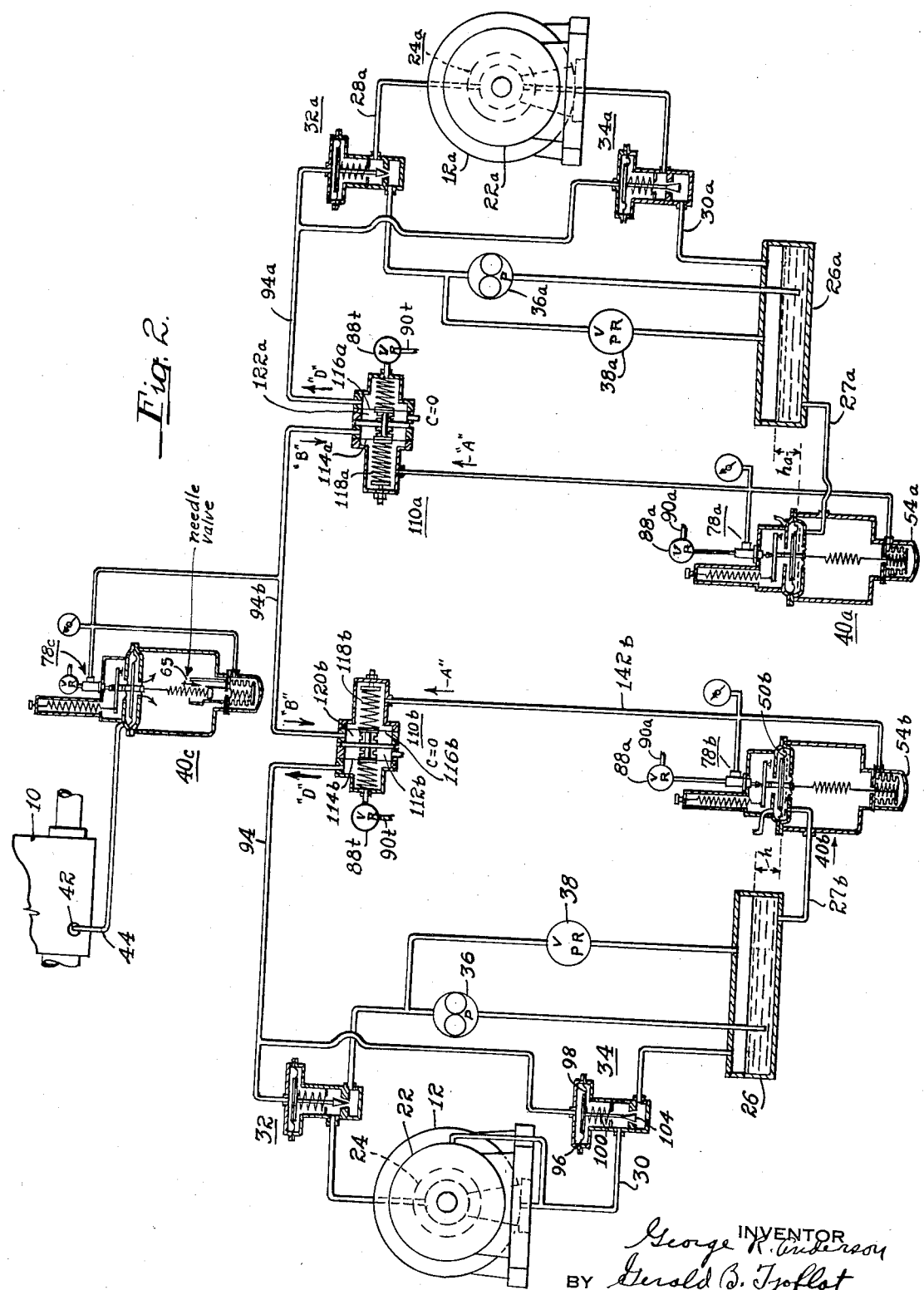

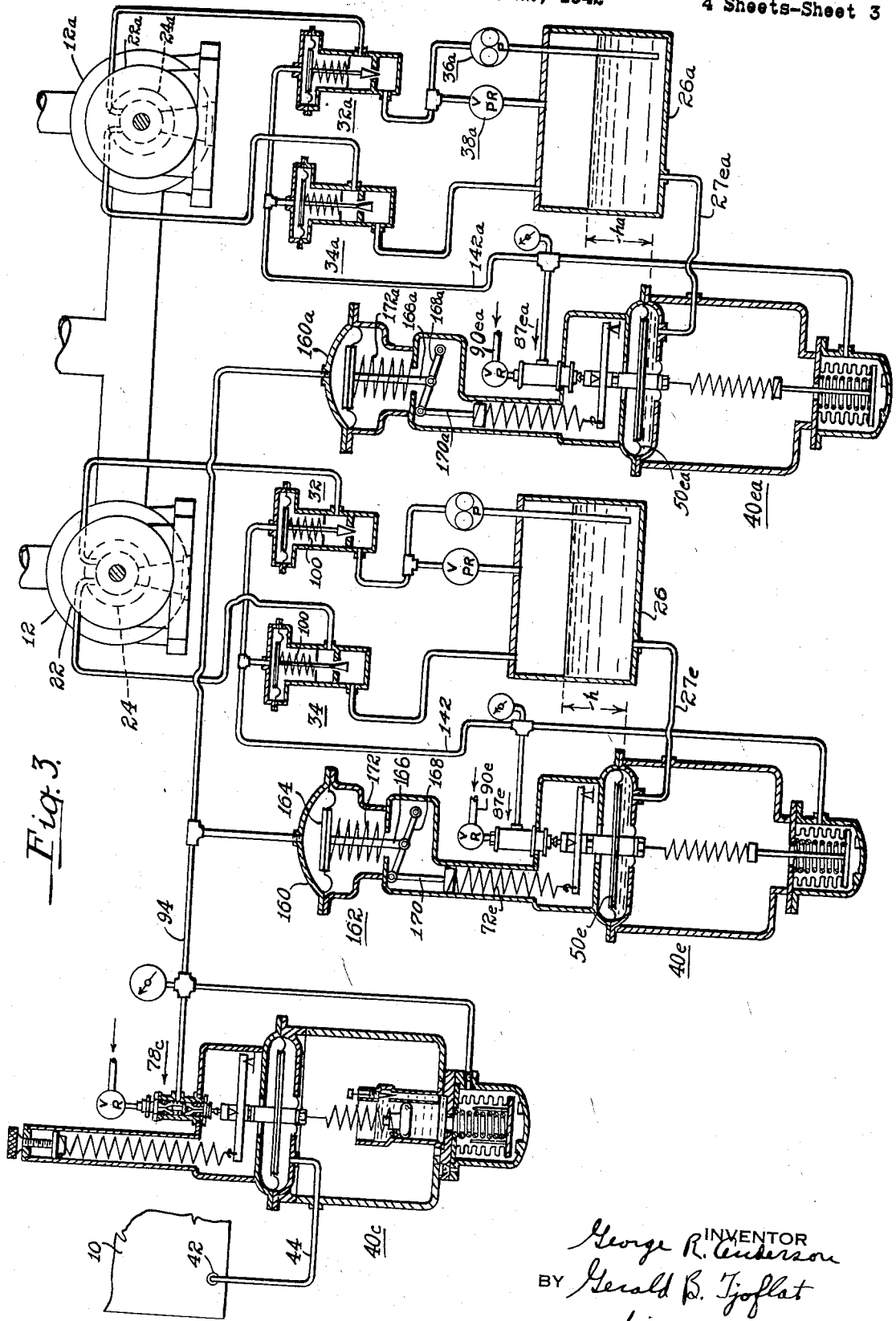

May 23, 1944.    G. R. ANDERSON    2,349,329
CONTROL SYSTEM
Filed June 22, 1942    4 Sheets-Sheet 4
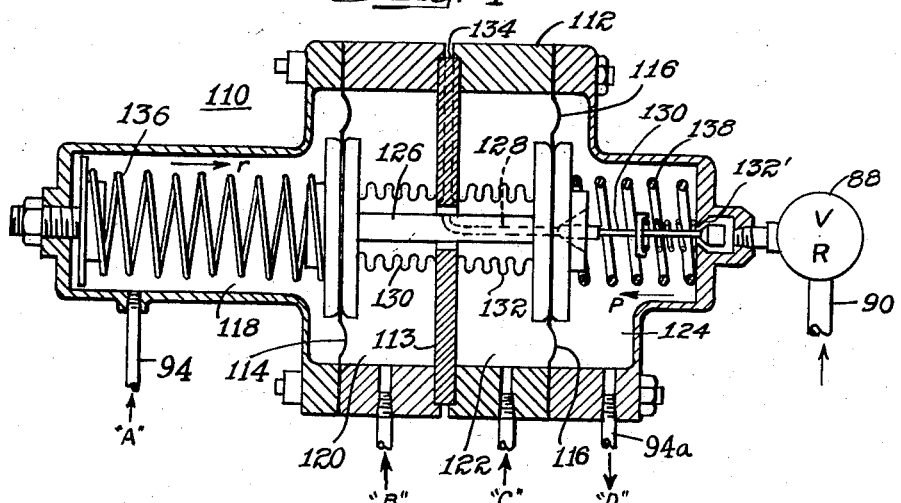
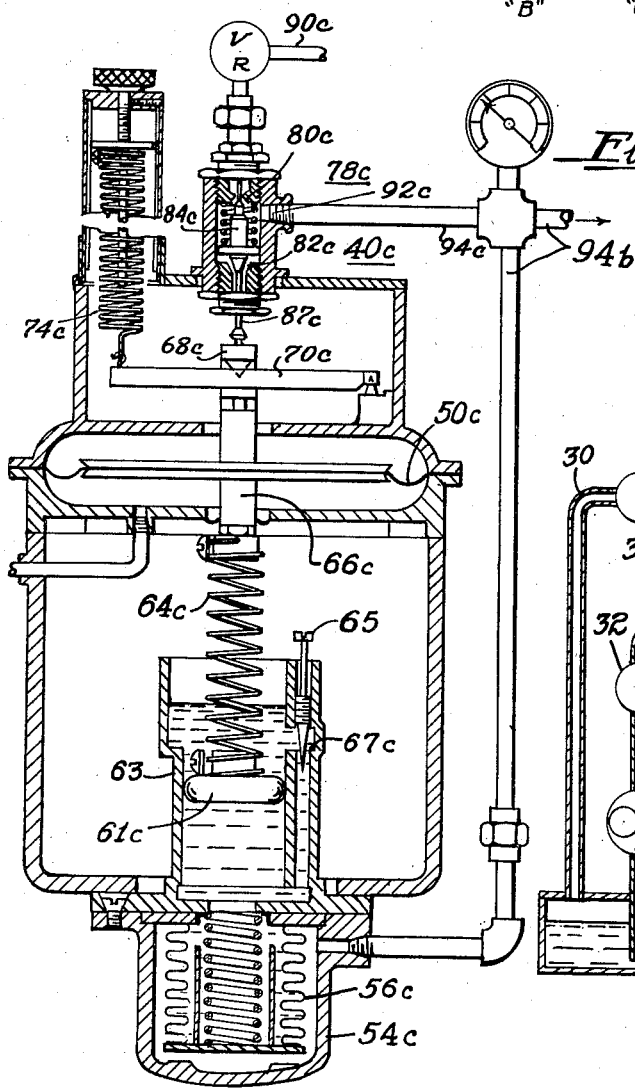
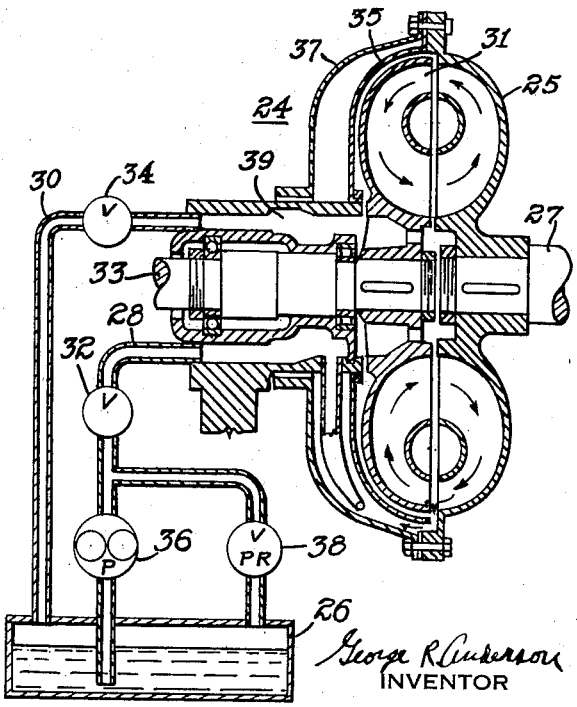
George R Anderson
INVENTOR
BY Gerald B. Tjoflat
his ATTORNEY Patented May 23, 1944

2,349,329

UNITED STATES PATENT OFFICE 2,349,329

CONTROL SYSTEM

George R. Anderson, Mount Lebanon, Pa., assignor to John M. Hopwood, Mount Lebanon, Pa.

Application June 22, 1942, Serial No. 447,929

9 Claims. (Cl. 236—15)

This invention relates to control systems for couplings of the slip type which form the transmission between motors or prime movers and driven work producing units such as fans, blowers, or pumps and more particularly to control systems adapted to control and regulate the division of load between two or more of such work units operating in parallel. The control system is particularly applicable where each work unit is driven by a separate motor or prime mover through a slip transmission.

When fans or blowers driven by separate motors or prime movers are operated in parallel, it is quite difficult to obtain equal load distribution among the individual fans or blowers or work units. This is particularly true when the fans or blowers have decidedly flat head characteristics.

In cases where fan or blower out-put is controlled by adjusting the slip of the transmission between the motor and the fan, the slip is adjusted by regulating the energy transmitting media of the coupling.

The term "slip transmission" as used above and in the following description means a transmission of the type in which the energy transmitted from the driving unit or motor to the driven work unit, such as a fan or blower, is proportional to a constant K times the square of the difference in speed of rotation of the driven and the driving member of the transmission. For example, in the case of an electric slip coupling where a driving exciting member and a driven closed circuit secondary are employed, the power transmitted is proportional to a constant K (where K is dependent on the excitation value) and times the square of the difference in speed of rotation of the driven and the driving members. In the case of a slip coupling of the hydraulic or fluid type (the Froude dynamometer type for example) the power transmitted is proportional to a constant K (where K is dependent on the quantity of fluid or liquid in the coupling) times the square of the difference between the speed of the driven and the driving members of the coupling.

The difference between the speed of rotation of the driven and driving elements of a slip coupling is called slip. Therefore it can be said that power transmitted through a slip coupling is proportional to $K \times S^2$ where $S=$slip.

For purposes of illustration, the invention will be described specifically in connection with slip couplings of the liquid or fluid type from which it will be apparent that the constant K will be proportional to the quantity of liquid within the coupling and coacting with the driven and driving members thereof and that the slip (S) is the difference between the rotative speeds of the driven and driving members of the coupling.

Given couplings of the same or substantially the same characteristics and equal rotative speeds of the driven members of the couplings the power transmitted by any one coupling may be regulated by adjusting K through the expedient of adjusting the quantity of liquid in the couplings. By maintaining equal or proportionately equal quantities of liquid in the respective couplings, the power transmitted by any one coupling will be equal to or proportionately equal to the power transmitted by any other couplings.

A convenient way of regulating the quantity of liquid in a coupling is to utilize a reservoir for the slip liquid and pumping the liquid from the reservoir through the coupling and back again to the reservoir at such a rate that the desired quantity of liquid within the coupling is maintained. By regulating the rate of circulation through all of the couplings at such rates that the level or quantity of liquid remaining in the reservoirs are equal then each coupling will contain the same amount or quantity of slip liquid. Experimental data have shown that there is a much closer relation between the load on a fan and the liquid level in the reservoir of the slip coupling than there is between fan speed and fan load when two or more fans are operated in parallel. This factor is taken into account in the control system embodying the hereinafter described invention.

An object of this invention therefore is to provide a control system that shall be adapted to so control the rate of flow of liquid into and out of slip couplings of parallel operated work units such as fans that the level of liquid in the reservoir of each coupling will be a measure of the quantity of liquid in each coupling.

Another object of the invention is to provide a control system which is provided with means that shall be responsive to liquid level in the respective reservoirs and so control the relative rates of inflow to and outflow from the couplings that the liquid level in each reservoir is maintained constant for any given fan output.

A still further object of the invention is to provide means for so loading the liquid level responsive means that a wide range of liquid levels in the reservoirs may be established to provide for a corresponding range of fan output.

Other objects of the invention will in part be apparent and will in part be obvious from the following description taken in conjunction with the accompanying drawings in which:

Figure 2 is a diagrammatic view of a control system for slip couplings embodying a modified form of the invention;

Figure 3 is a diagrammatic view of a control system for slip couplings embodying a further modified form of the invention;

Figure 4 is a view in longitudinal section of a relay embodied in the systems of Figs. 1 and 2;

Figure 5 is a view in vertical section with parts shown in full, of regulator embodied in the control systems shown in Figs. 2 and 3;

Figure 6 is a vertical section showing the construction of the hydraulic couplings of Figs. 1 and 2.

Throughout the drawings and the specification like reference characters indicate like parts.

Figure 1:
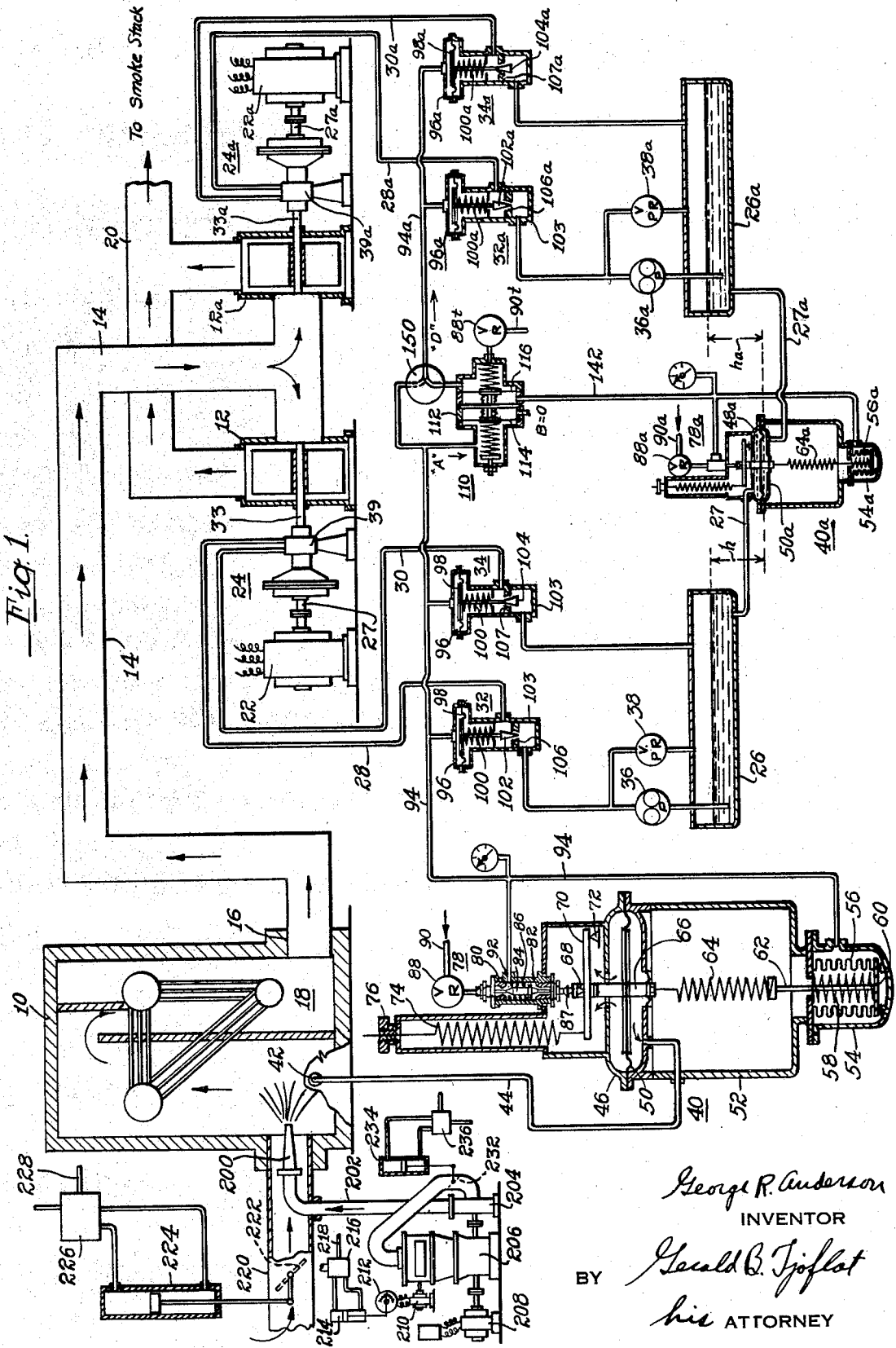
Figure 1 is a more or less diagrammatic view of a prepared form of a control system embodying the invention as applied to the control of the slip couplings of induced draft fans of a boiler furnace, the system as illustrated operating automatically to so regulate the slip of the couplings that combined fan output maintains substantially constant pressure in the combustion chamber of the furnace.

In the drawings, I have shown in Fig. 1 what now appears to be a preferred embodiment of the invention as applied to a boiler furnace 10 provided with a plurality of exhaust or induced forced draft fans 12 and 12a that are connected to operate in parallel. The intakes of these fans are connected to the furnace exhaust duct 14, the latter being connected to a suitable outlet opening 16 of the combustion chamber 18 of the furnace. The combustion gases are discharged by the fans into a flue 20 which in practice leads to a suitable smoke stack (not shown). Fan 12 is driven by a prime mover 22 such as an electric motor preferably a constant speed motor. Motor 22 drives the fan 12 through a transmission 24 of slip type. As illustrated coupling 24 is an hydraulic slip coupling of the Froude type.

Coupling 24 is provided with a reservoir for liquid such as oil and this liquid is circulated through the coupling in a closed circuit that includes a delivery pipe 28 and a return pipe 30. A valve 32 is included in pipe 28 and a valve 34 in pipe 30. These valves are so disposed as to provide means for increasing or decreasing the quantity of slip liquid that is within coupling 24 thereby varying the power transmitted from motor 22 to fan 12.

A pump 36, for example a rotary gear pump, is connected in pipe 28 to pump liquid from the tank to the slip coupling and a by-pass or relief valve 38 is employed to allow liquid to be discharged from the outlet of the pump directly to the tank whenever the pump is delivering more liquid than is required by the coupling 24.

Similarly fan 12a is driven by a prime mover 22a through a slip coupling 24a of the Froude type, the latter communicating with oil tank 26a through a delivery pipe 28a and a return pipe 30a; a valve 32a controls flow through pipe 28 and a valve 34a controls flow in the return pipe 30a. Coupling 24a is provided with a reservoir 26a, a pump 36a and a relief or by-pass valve 38a, all of which are similar to valves 32 and 34, pump 36 and return or by-pass valve 38a.

The hydraulic couplings 24 and 24a are of the Froude type and known as slip couplings. The construction of these couplings is shown in Fig. 6. As shown in Fig. 6, the coupling comprises a radially vaned impeller or driving member 25 mounted on a shaft 27 of prime mover 12 (see Fig. 1). Liquid such as oil circulates between the impeller and runner in the direction of the arrows in response to rotation of member 25 causing the driven member 31 to rotate in the same direction as the driving member. The principle of operation of this type coupling is well known and need not be described further in detail. However, it may be stated that the power transmitted by member 25 and the liquid within the coupling to the driven member 31 is proportional to $KS^2$ where $K =$ a constant whose value depends on the quantity of liquid in the coupling and S is the difference between the rotative speeds of members 25 and 31. An inner casing 35 and an outer casing 37 rotate around a stationary manifold 39 and with the impeller 25 to which they are secured. Manifold 39 is connected to reservoir 26, by pipes 28 and 30 as has already been stated. When both valves 32 and 34 are closed and there is a given quantity of liquid in the coupling the power transmitted through the coupling is constant provided the load on the driven member 31 remains constant. By opening valve 32, liquid will be delivered by pump 36 from tank 26 into manifold 39 and thence into the space between impeller 25 and runner 31 thereby increasing the quantity of oil in the coupling and the power transmitted to the fan shaft 33.

If valve 34 only is opened, oil will be discharged from the coupling by centrifugal force through the manifold into the tank thereby decreasing the quantity of the slip oil within the coupling as well as the power transmitted to driven fan shaft 33.

A pressure measuring device, such as a fluid pressure regulator, generally designated by 40, is connected through piping 44 at a suitable port 42 to the combustion chamber 18 of boiler 10. The fluid pressure regulator 40 may be any known suitable pressure regulating device, the one illustrated being of the type shown in U. S. Patent 2,149,390 issued on March 7, 1939. Regulator 40 comprises a diaphragm housing 46 having a diaphragm 50 therein which divides the housing into upper and lower chambers, the latter being connected by piping 44 to combustion chamber 18, while the upper compartment communicates with the atmosphere. Housing 46 is supported on a casing 52 which carries a bellows chamber 54 in which a bellows 56 is disposed. Bellows 56 is urged towards its extended position by means of a compression spring 58 pushing on base plate 60 that is rigidly fixed to the bellows. A rod 62 is secured at its lower end to base plate 60 and the upper end thereof is connected to one end of a tension spring 64 the other end of which is fixed to diaphragm stem 66 attached to diaphragm 50. The lower part of the diaphragm stem 66 is sealed by a seal 66' so that the lower compartment of the diaphragm housing 46 is pressure tight; the upper portion of stem 66 carries a yoke provided with knife-edge pivot 68 resting on a beam 70 which is fulcrumed on stationary knife-edge 72. A loading spring 74 is adjustably connected at one end to a thumb screw 76 and the other end thereof is connected to beam 70. This spring urges diaphragm 50 upwardly and carries the dead weight of the diaphragm and the parts connected to it.

An escapement valve 78 is mounted in cooperative relationship with the yoke of stem 66. This escapement valve is provided with an inlet port 80 and a discharge port 82 between which a valve stem 84 is mounted for vertical reciprocation. When the valve stem is in its top position, inlet port 80 is closed and the exhaust port 82 wide open and when the stem is in its lower position the exhaust port is closed and the inlet port is open wide. Valve stem 84 is urged downwardly by its own weight and by the pressure of a weak spring 86 pressing the extension of the valve stem 84 to a link 87 that rests on the top of the yoke of stem 66, so that the valve stem 84 follows the up and down movements of diaphragm 50. The inlet port 80 is connected to piping 90 to which a source of supply a fluid medium such as compressed air is connected and maintained at a constant pressure, say 60 lbs. per sq. in. at the valve inlet by means of pressure regulator V. R. The escapement valve 78 has also a sending port 92 positioned between inlet port 80 and outlet port 82; this port 92 is always open and is connected by a control piping 94 to the operators of valves 32 and 34, and also to the bellows chamber 54. The control pressure sent out through port 92 and piping 94 will vary between 0 and 60 lbs. gauge as the valve stem 84 is moved by diaphragm 50 throughout its range of travel. When valve stem 84 is in its uppermost position and inlet port 80 is closed and the exhaust port 82 is open, the air pressure in control piping 94 will be 0 gauge; when the valve stem 84 is in its lowermost position and the exhaust port 82 is closed the pressure in control piping 94 will be equal to the pressure of the air at the inlet port 80, namely 60 lbs. gauge.

The moving parts and springs of escapement valve 78 and of diaphragm regulator 40 are so dimensioned, and adjusted, that when the draft in the combustion chamber 16 is normal and consequently the difference of the pressures at 42 and that of the atmosphere has a predetermined "neutral" value, the diaphragm 50 will occupy a middle or "neutral" position and the sending pressure in control piping 94 will have a predetermined "neutral" value, say 15 lbs. per sq. in. The bellows 58, acted upon externally by the control pressure in piping 94, tend to return the diaphragm into its neutral position and prevent the full stroke displacement of the diaphragm by any measurable deviation of the draft pressure at 42 from its neutral value.

The known increase valve 32 and the decrease valve 34, each comprise a diaphragm chamber 96 sealingly divided by diaphragm 98 into top and bottom compartments, the former being connected to control piping 94 and under the control pressure from escapement valve 87; the latter being open to atmosphere and accommodating compression spring 100, increase valve stem 102 respectively decrease valve stem 104, which are attached to diaphragm 98 and sealingly extend into valve body 103 coacting therein with increase port 106 and decrease port 107 respectively, opening or closing the passage for oil in the increase piping 28 and decrease piping 30. Spring 100 urges the increase valve stem 102 away from port 106 to permit the oil to flow from pump 36 into hydraulic coupling 24, while decrease valve stem 104 is urged by cooperating spring 100 in a direction to close port 107 against the hydrodynamic pressure of the energized oil preventing the return of energized oil from the hydraulic coupling 24 into the oil tank 26. The diaphragm 98 and springs 100 are so dimensioned and adjusted, respectively, that when escapement valve 78 sends out the neutral control pressure, say 15 lbs. the valve stems of the increase and decrease valves are actuated to close their respective ports, therefore no change in the quantity of the energized oil in the coupling, and no variation in the transmitted power through coupling 24, nor in the speed of the driven fan occur. When, however, the control pressure in piping 94 rises above the neutral pressure, (this happens when the draft pressure at 42 falls and diaphragm 50 moves downwardly from its middle position) the increase valve remains closed but the decrease valve will be opened by the diaphragm 98 and oil will flow from the hydraulic coupling 24 into tank 26, decreasing the quantity of the energized oil and correspondingly the power transmitted from prime mover 22 to fan 12, diminishing its speed and the quantity of gas exhausted by it per second. Conversely, when the control pressure in piping 94 falls below the neutral pressure (when the draft pressure at 42 rises) the decrease valve stem 104 will stay closed upon port 106 but in the increase valve 32 the spring 100 will lift upwardly the diaphragm 98 and with it the valve stem 102, permitting the oil to flow from pump 36 into hydraulic coupling 24, increasing the amount of the energized oil, with it its kinetic energy and the power transmitted upon fan 12.

A similar arrangement exists between hydraulic coupling 24a and oil tank 26a the control pressure being transmitted through piping 94a to increase valve 32a and decrease valve 34a, causing diaphragm 98a, springs 100a, increase valve stem 102a, decrease valve stem 104a and ports 106a and 107a to act in the above described manner, decreasing the quantity of energized oil in hydraulic coupling 24a when the control pressure rises above the neutral in control piping 94a and increasing the quantity of energized oil therein when the control pressure in piping 94a falls below the neutral. The control piping 94 and 94a are connected by a known pressure summing device or "totalizer" generally indicated by 110.

As best seen in Fig. 4 the totalizer 110 comprises housing 112 composed of the necessary annular parts and rigid partition 113 to accommodate the diaphragms 114 and 116 sealingly dividing the housing into chambers 118, 120, 122, and 124. Rigid stem 126 connects the two diaphragms for identical reciprocating movement. Stem 126 has an exhaust duct 128 forming in chamber 124 a port, controlled by valve stem 130 which also controls the inlet port 132 admitting or excluding the pressure medium arriving through reducing valve 88b and piping 90b from a suitable source such as an air compressor (not shown). Bellows 130 and 132 seal a central space around stem 126 from which the pressure medium escapes through duct 134 (in partition 113) into the atmosphere. In chamber 118 spring 136 is adjustably accommodated urging diaphragm 114 with pressure $p$ to the right. In chamber 124 spring 138 is accommodated urging diaphragm 116 with pressure P toward the left. The effective area of each of diaphragms 114 and 116 is Q. Compressed air from a source (not shown) enters chamber 118 with a pressure A (lb. per sq. in.) through piping 94; compressed air from a second source enters chamber 120 at pressure B through piping 140 and compressed air from a third source (not shown) enters chamber 122 at pressure C through piping 142. Compressed air from a fourth source of constant pressure (not shown) is introduced at controlled values to chamber 124, through piping 90b, reducing valve 88b and valve port 132', and from chamber 124 pressure is transmitted at pressure D into piping 94a. The valve stem 130 is moved by the diaphragm, subject to the variable pressures, into a position in which the pressures acting on both sides of diaphragm 116 are equal, hence $$DQ = AQ + CQ - BQ + p - P$$

In the present combination, the piping 140 communicates with the atmosphere, hence, $B=0$ (no pressure over the atmospheric in chamber 120) and the resultant pressure sent out through control piping 94a $$D = A + C + \frac{p-P}{Q}$$

Selecting, respectively adjusting springs 136 and 138 so that $$\frac{p-P}{Q} = -15$$

then $$C + \frac{p-P}{Q} = 0$$

when $C=15$, the neutral pressure, and in this case $D=A$.

When C is smaller than 15, D will be correspondingly smaller than A and when C is greater than 15, D will be accordingly greater than A.

In Fig. 1, C is the control pressure sent out in piping 142 from a second diaphragm regulator 40a shown to a smaller scale, which is similar to regulator 40 but differs therefrom in that the top and bottom compartments of its diaphragm chamber 48a are connected to the oil tanks 26 and 26a by pipes 27 and 27a so that its diaphragm 50 is responsive to the difference between the hydrostatic pressures of the oil in the tanks expressed as $(h-ha)gq$ where $g$ is the gravitational acceleration and $q$ is the density of the oil. The thickness of diaphragm 50a being negligible, this differential pressure is determined by the level difference of quantities of oil in both tanks expressed as $h-ha$.

The moving parts and springs of this second regulator 40a and the escapement valve 78a are so adjusted that the control pressure C in piping 142 will be 15 lb. or the neutral pressure when the levels in both tanks are the same $(h-ha=0)$ the diaphragm 50a occupying its middle or neutral position. The total individual oil capacities of couplings 24 and 24a, their tanks 26 and 26a and the connecting pipings being equal in above case the quantities of the energized oil in both couplings must be also equal, hence, the power transmitted through fan 12 and 12a will be the same. In such case, $D=A$ hence the pressure in control piping 94a will be the same as in control piping 94. As a consequence the increase valves 32 and 32a respectively, the decrease valves 34 and 34a will be actuated in unison. Differences in the volumes of the pipings can be made ineffective by adjustment of the regulator 40a.

150 is a two-way valve which, in the position shown, operatively connects totalizer 110 and diaphragm regulator 40a with control piping 94a but if turned 90°, it disconnects them de-energizing coupling 24a and taking blower or fan 12a out of operation, to take care of the case of partial capacity operation when only one prime-mover is utilized with its driven fan, which may be any of the shown two units.

Pulverized coal burner 200 receives the pulverized coal suspended in primary air through piping 202 delivered by fan 204 in the direction of the arrow from pulverizing mill 206 driven by an electric motor 208. 210 is the electric motor driving the coal feed mechanism at a speed varied by rheostat 212 which is set by hydraulic motor 214 controlled by a suitable control device 216 receiving the control pressure impulse through pipe 218 from a master sender (not shown) which is responsive to some condition that is to be kept constant say the pressure of the generated steam. The secondary air, necessary for the combustion of the pulverized fuel arrives at the burner 200 through pipe 220 due to the suction effect of exhaust fans 12 and 12a. The intake of secondary air through pipe 220 is controlled through butterfly valve 222 set by hydraulic motor 224 controlled by a suitable control device 226 receiving the control pressure impulse through pipe 238 from the master sender (not shown). Similar arrangement controls butterfly valve 232 to vary the quantity of the primary air and pulverized coal received by burner 200 comprising hydraulic motor 234 and control device 236.

The apparatus shown in Fig. 1 functions as follows:

Corresponding to greater or lesser steam demand on boiler 10 the quantity of pulverized fuel and that of the secondary air is automatically increased or decreased by further opening or closing, respectively, butterfly valves 22 and 232 governed by control devices 226 and 236 responsive to the impulse coming from the master sender.

Assuming that the steam demand on the boiler 10 is at a middle rate and the steam pressure is the required normal, the impulse from the master sender sets the butterfly valves 222 and 232 and the rheostat 212 in their middle positions, the pressure in the combustion chamber 18 at port 42 and in piping 44 is the predetermined "neutral" value, say 0.1" water column; hence diaphragm 50 of regulator 40 and valve stem 84 of escapement valve 78 will occupy their middle or neutral positions sending out the neutral pressure, say 15 lbs. under which increase valves 32 and 32a and decrease valves 34 and 34a are closed, the quantity of the energized oil in each of the hydraulic couplings 24 and 24a does not change, and fans 12 and 12a are driven by their prime movers 22 and 22a at about half power and at about half speed.

Assuming further, that the quantities of the energized oil in hydraulic couplings 24 and 24a are equal, the oil levels in tanks 26 and 26a will be the same $h=ha$ causing the sum of the hydrostatic pressures acting upon diaphragm 50 of regulator 40a to be zero. Consequently, the control pressure in piping 142 will be $C=15$ lbs. the neutral pressure, and D, the control pressure in piping 94a will equal A, that in piping 94 which is 15 lbs. causing the increase valve 32a and decrease valve 34a to close and no variation in the quantity of the energized oil in hydraulic coupling 24a will occur. As a consequence fan 12a is driven by its prime mover 22a with the same power, accomplishing the same work as fan 12, driven by prime mover 22, both fans exhausting gases equally at the rate necessary to maintain the "neutral" pressure, say (0.1" W. C.) at 42. The speeds of prime movers 22 and 22a are constant and sufficiently high, developing sufficient power to drive the respective fans at predetermined maximum speed and exhausting the maximum amount of gases required.

Let us suppose, however, that for some reason one fan, say fan 12, would take a greater share of the work and exhaust more gases than fan 12a. This would be possible only when the quantity of the energized oil in hydraulic coupling 24 is greater than that in the other coupling 24a. In such case (aside of oil leakage which can be corrected, hence disregarded) the total oil in each circuit being constant, the level of the oil in tank 26, and its hydrostatic pressure upon diaphragm 50a must be necessarily lower than that of the oil in tank 26a. Consequently, diaphragm 50a will move upward, the sending pressures C and D in control piping 142 and 94a, respectively, will become less than 15 lbs., the neutral pressure, the increase valve 32a will open and admit oil into coupling 24 until the oil levels in the tanks and the quantities of the energized oil in both couplings are equal at which moment both fans will furnish equal work, each exhausting at equal rate the combustion gases, establishing the flow necessary to maintain the required pressure (0.1" W. C.) at 42 at the particular position of butterfly valve 222.

Assuming now that the steam demand increased, hence the steam pressure decreased, and the master regulator sent out an impulse which set the butterfly valves 222 and 232 and the rheostat 212 further open to increase the fuel supply and the secondary air intake. The opening of butterfly valve 222 causes the pressure in the combustion chamber 18 to drop, hence the pressure at 42 and in piping 94 will fall as the valve stem 84 has been moved closer to inlet port 80. Due to the lowered pressure in control piping 94, increase valve 32 will open (urged by spring 100) allowing oil to pass from pump 36 into hydraulic coupling 24, increasing the quantity of the energized oil therein and the power transmitted by prime mover 22 to fan 12. As a result the speed of the fan 12 will increase and with it its suction and induced draft effect. If the oil levels in tanks 26 and 26a are equal, the control pressure in piping 94a will be equal to that in piping 94, the control pressure in piping 142 becomes neutral at 15 lbs. hence the same change will be effected upon the energized oil quantity in coupling 24a as is happening in coupling 24, namely the quantity of oil in coupling 24a and the power transmitted through it to fan 12a will be increased until the increased suction effect reestablishes the neutral pressure in the combustion chamber at 42. In that moment diaphragm 50 regains its neutral position, the pressures in pipings 94 and 94a become neutral, all increase and decrease valves will be closed and the quantity of energized oil will be maintained, and the fans will be driven at higher speeds and at the increased outputs required to meet the increased steam demand on the boiler.

Assuming now that the steam demand on the boiler 10 decreases, the master regulator sends out an impulse to decrease the fuel supply and secondary air intake by closing somewhat the butterfly 222. This causes a decrease of the pressure at 42 and in piping 44, whereby diaphragm 50 of regulator 40 is moved downwardly by the atmospheric pressure against the pull of spring 74. Consequently, valve stem 84 moves downwardly, closer to outlet port 82 resulting in an increase of the pressure in control piping 94 and the opening of the decrease valve 34, allowing oil to pass from the hydraulic coupling by the pressure of the centrifugal force into oil tank 26, thereby decreasing the quantity of energized oil in the coupling. As a result, the transmitted power upon fan 12, its speed, rate of work, and its suction effect are decreased.

Diaphragm regulator 40a, responding to the variations in the oil level of tank 26 equalizes in the already-described manner the oil level in tank 26a with that in tank 26 and through the effect of totalizer 110 makes the same decrease in the energized oil quantity in coupling 24a equalizing the transmitted power and rate of work, hence the lowered output of the two fans until the neutral pressure at 42 in the combustion chamber is reestablished.

In the first embodiment the increase and decrease valves controlling the quantities of the energized oil in the hydraulic couplings respond directly to a varying condition which is to be kept constant (here the draft pressure in the combustion chamber) while other means simultaneously equalize the quantity of the energized oil in both couplings.

Fig. 2 shows a second preferred embodiment of the invention which differs from the first embodiment only in that the control impulse sent out by the control means responsive to the varying condition that is to be kept constant, is modified by control means responsive to the hydrostatic pressure of the oil in each tank and this modified pressure impulse operates the increase and decrease valves and regulates the quantity of the energized oil in both couplings.

Fan 12 is driven by prime mover 22 through hydraulic coupling 24 which is connected to its tank 26 by increase piping 28 and decrease piping 30, the former including increase valve 32, pump 36 and pressure relief valve 38; the decrease piping including the decrease valve 34. Diaphragm regulator 40b is responsive to the hydrostatic pressure (proportionate to level difference $h$) of the oil in tank 26 inasmuch as its lower diaphragm chamber is connected with the tank while the upper chamber is connected to the atmosphere. The regulator receives through reducing valve 88b and piping 90b compressed air that enters at constant pressure escapement valve 78b sending the control pressure through piping 142b into chamber 118b of totalizer 110b, the chamber 120b of which totalizer is connected through piping 94b to the escapement valve 78c of regulator 40c, the upper diaphragm chamber of which totalizer 110b communicates by piping 44 with the combustion chamber at 42 of boiler 10 (shown fragmentally).

Regulator 40c is the same as regulator 40 except that it has a dash pot 63 instead of the central rod 62, representing another embodiment of the regulator invented by R. R. Donaldson forming subject matter of Patent 2,149,390. This regulator is shown in Fig. 5. The differing parts are the oil containing dashpot 63 which communicates with the inside space defined by bellows 56c in which piston 61c is sealingly and reciprocably mounted on spring 64c. Adjustable by-pass valve 65c cooperating with seat 67c regulates the free passage and hence the resistance of the by-pass to the passage of oil from one side of the piston to the other in the dashpot. The control pressure from the escapement valve 78c is communicated through piping 94b to the outside of the bellows 56c into bellows chamber 54c and also to the chambers 120c and 120b of totalizers 110a and 110b. The dash pot and coacting parts serve to restrain the diaphragm against moving from its mid position in response to change in the pressure difference in the diaphragm chamber 48c and thus prevents hunting.

The embodiment shown in Fig. 2 operates as follows: When the steam demand on boiler 10 rises and the master control moves butterfly valves 222 and 232 from their middle positions to further open them, the pressure rises in piping 44, hence diaphragm 50c and valve stem 82c move downwardly, the control pressure B in piping 94b rises above the neutral; chamber 122a being here connected to the atmosphere C=0 and the pressure D in piping 94 will be $$D = A - B + \frac{p-P}{Q}$$

B being now greater, D becomes less than the neutral pressure, consequently increase valve 32 will open and oil flows from tank 26 through pump 36 into hydraulic coupling 24, increasing the quantity of the energized oil therein and the power transmitted to fan 12, whose rate of output will increase proportionately.

While the quantity of the energized oil is increased in coupling 24, the quantity of oil in tank 26 decreases so that the hydrostatic pressure upon the lower surface of diaphragm 50b is decreased causing the diaphragm to move downwardly carrying with it the stem of escapement valve 78b. In consequence the control impulse A in pipe 142b will rise until it balances the increased pressure B in piping 94b at which moment pressure D in piping 94 becomes neutral and increase valve 32 closes.

Conversely, when the pressure condition at 42 increases and the pressure in piping 44 falls, due to reduced steam demand and closure of the butterfly valve 222, diaphragm 50c and stem 82c will move upwardly, the pressure B in piping 94b will decrease and pressure D in piping 94 will increase, hence the decrease valve 34 opens permitting the drainage of the energized oil from coupling 24 into tank 26 causing a corresponding decrease in power transmitted to fan 12. Simultaneously the hydrostatic pressure of the oil upon the lower surface of diaphragm 50b will rise and lift the stem of valve 78b decreasing the control pressure A in piping 142b until it balances the pressure B at which moment the pressure D becomes neutral and decrease valve 34 closes.

Simultaneously, with the increase or decrease, respectively of the quantity of the energized oil in coupling 24, the identical changes will be effected in the coupling 24a, the latter being provided with similar control equipment designated with the same numerals having the suffix "a."

Hence in this, as well as in the previously described embodiment the predetermined draft pressure will be maintained, the exhausting fans always equally sharing the work, irrespective of the load on the boiler.

Fig. 3 shows a third preferred embodiment of the invention in which the control impulse sent out by the control means responsive to the varying condition act upon secondary control means which react also to the hydrostatic pressure of the oil in the respective tanks and issues an impulse that operates the increase and decrease valves thereby regulating the quantity of oil in each coupling.

As shown in Fig. 3 the lower compartment of diaphragm chamber 48c of regulator 40c communicates through piping 44 with the combustion chamber of boiler 10 at 42. Regulator 40c is the same as described in connection with Fig. 2. The control impulse from escapement valve 78c reaches the top compartments of diaphragm chambers 160 and 160a of loading devices 162 and 162a of regulators 40ea and 40e, respectively, the latter regulator controlling the increase valve 32 and the decrease valve 34 of hydraulic coupling 24 of fan 12 driven by prime mover 22; the former regulator controlling the increase valve 32a and the decrease valve 34a of hydraulic coupling 24a of fan 12a, driven by prime mover 22a. Regulators 40e and 40ea are the same as regulator 40 in Fig. 1, except that the former are provided with loading device 162 instead of the thumb screw adjustment 76 of the latter. In loading device 160 diaphragm 164 is acted upon by the control pressure prevailing in piping 94 tending to move it downwardly relaxing spring 72 connected to the diaphragm 164 by stem 166, pivoted lever 168 and connecting rod 170. Diaphragm 164 is urged upwardly by spring 172 tending to increase the tension of spring 72b. The dimensions and adjustments of diaphragm 164, lever 168 and springs 72 and 172, respectively, are such that when the pressure in the control piping 94 is the neutral one, say 15 lbs., the control pressure sent out by regulator 40e through piping 142 is also the neutral one, that is 15 lbs., provided the hydrostatic pressure of the resting oil in tank 26 upon the lower part of diaphragm 50e is equal to that in tank 26a upon diaphragm 50ea, in which case $h=ha$. Regulator 40ea is exactly the same as regulator 40e.

The apparatus shown in Fig. 3 operates as follows:

When the draft pressure at 42 is the required neutral one, meaning that the energized oil quantities in the hydraulic couplings are sufficient to transmit enough power to the fans that they produce the necessary flow of the exhaust gases to establish the neutral pressure at 42, the control pressure transmitted from regulator 40c to piping 94 will be also neutral, 15 lbs., for reasons described in detail in the former embodiments. But in such case the regulators 40e and 40ea will send out the same neutral pressure in piping 142 and 142a, respectively, under which all increase and decrease valves remain closed, hence, the quantities of the energized oil will not be changed in the couplings and the neutral draft pressure at 42 will be maintained.

Assuming now that due to increased steam demand the master regulator opens butterfly valves 222 and 232 to increase the fuel and the secondary air supply, the vacuum at 42 will diminish and the pressure in piping 44 rises. As a consequence diaphragm 50c and valve stem 82c will move upwardly, the pressure in control piping 94 will fall, spring 172 moves diaphragm 164 upwards, pulling on spring 72b which in turn lifts diaphragm 50 and valve stem 82e. As a consequence, the control pressure in piping 142 will fall, so that spring 100 opens the increase valve 32 admitting oil from pump 36 into hydraulic coupling 24. The same thing happens simultaneously in coupling 24a due to the identical action of regulator 40ea and of the other control members identical to those coacting with coupling 24. The increase in the quantity of the energized oil increases the power transmitted by the couplings to fans 12 and 12a with a corresponding increase in their exhaust-work and reestablishing the neutral vacuum at 42, which when achieved, will cause the sending pressures in piping 94, 142 and 142a to become neutral stopping further changes in the quantity of oil in the couplings, and maintaining the required draft pressure at 42 because of the increased output of the fans, each of which will share the work equally. Should this, for any reason, not be the case, the difference between the hydrostatic pressures caused by unequal quantities of oil in the tanks will effect the necessary corrections in the quantities of oil in the couplings until the quantities in each are equalized.

In case of decreased steam demand on the boiler and increased vacuum at 42 due to the closing of butterfly valve 222 by the master combustion control, the pressure in piping 94, 142, and 142a would rise above the neutral, opening the decrease valves 34 and 34a and diminishing the quantity of oil in both couplings until the power transmitted to the fans and their rates of exhaust reestablishes the neutral draft pressure at 42, both fans again sharing equally the work.

It is obvious that fans 12 and 12a may be located also ahead of the combustion chamber to supply forced draft instead of or in addition to induced draft and that instead of the fans any kind and any number of power utilizing devices may be used to which power is distributed equally among them, without departing from the scope and spirit of the invention.

It is therefore to be understood that the shown and described embodiments are intended to be exemplary ones only and they should not be considered as limiting the scope of the invention.

What I claim as new and desire to secure by Letters Patent is:

1. Means for equalizing work performance of power utilizing machines comprising for each of said machines a driving shaft coacting with a variable speed hydraulic coupling that has a vaned impeller attached to said driving shaft and a vaned runner fixed to a driven shaft connected to the respective machine, a separate tank for each coupling communicating therewith, fluid medium in each of said couplings to be energized by said impeller, the energized fluid impinging upon said runner and rotating it, a body of fluid in each of said tanks, pump means continuously tending to convey fluid from each tank into the respective couplings, measuring means influenced by a varying condition that is a function of the total power requirement at any instant, which condition is to be kept constant, and control means responsive to said measuring means for regulating the passage of fluid between each tank and its coupling for maintaining sufficient mass to fluid in the couplings to transmit the total power required, and correction means responsive to the quantity of fluid in each tank, said correction means coacting with said control means for equalizing the masses of energized fluid in all of said couplings.

2. Means for equalizing work performance of several fans creating draft in the combustion chamber of a furnace comprising for each of said fans a driving shaft coacting with a variable speed hydraulic coupling that has a vaned impeller attached to said driving shaft and a vaned runner fixed to a driven shaft connected to the respective fan, a tank for each coupling communicating therewith, fluid in each of said couplings to be energized by said impeller, the energized fluid impinging upon said runner and rotating it, a quantity of fluid in each of said tanks, pump means continuously tending to convey fluid from each tank into the respective coupling, measuring means influenced by the draft pressure in said furnace, control means responsive to said measuring means for regulating the passage of fluid between each tank and its coupling for maintaining sufficient fluid in the couplings to transmit to said fans the total power required to create a predetermined draft pressure in said furnace, and correction means responsive to the quantity of the fluid in each tank, said correction means coacting with said control means for equalizing the quantities of energized fluid in all of said couplings.

3. In combination, a boiler furnace, several fans for creating draft therein, a variable speed hydraulic coupling for each fan each coupling having a vaned runner fixed to a driven shaft connected to said fan and an impeller attached to a driving shaft rotated by a prime mover of such speed and such power that there is sufficient power for the maximum draft requirement, a tank for each of said couplings communicating therewith, fluid in said couplings, energized by said impellers, a quantity of liquid in said tanks, pump means tending to convey liquid from said tanks into said couplings, separate increase- and decrease valves for regulating the flow of liquid therebetween, a first fluid pressure regulator responsive to said draft-pressure and sending out a first impulse of compressed fluid at a pressure that corresponds to said draft pressure for positioning said valves to maintain the masses of energized liquid in said couplings at a value which is necessary for transmitting the total power required to create a predetermined draft pressure that is to be maintained, one second fluid pressure regulator for each of said hydraulic couplings responsive to variations in the quantities of liquid in said tanks and each sending out a second impulse of compressed fluid at a pressure corresponding to said variations in liquid quantities, for each second diaphragm regulator one pressure summing device coacting with the first and with the respective second regulators and issuing a third impulse as a resultant of the first two impulses for modifying said first valve suitably to equalize the quantities of the energized liquid in each of said couplings.

4. The combination according to claim 3 in which said pressure regulators are diaphragm operated and the second regulators are responsive to the level variations of the liquid in the respective tanks.

5. In combination, a boiler furnace, several fans for creating draft therein, a one variable speed hydraulic coupling for each fan each coupling having a vaned runner fixed to a driven shaft connected to said fan and an impeller attached to a driving shaft rotated by a prime mover of such speed and of such power that there is sufficient power for the maximum draft requirement, a tank for each of said couplings communicating therewith, liquid in said couplings being energized by said impeller, a quantity of liquid in said tanks, pump means tending to convey liquid from said tanks into said couplings, separate increase- and decrease valves for regulating the flow of liquid therebetween, a first fluid pressure regulator responsive to said draft pressure and sending out a first impulse of compressed fluid at a pressure that corresponds to said draft pressure furnishing one component of a valve positioning impulse, one second fluid pressure regulator for each of said couplings responsive to the quantity of liquid in the respective tanks and sending out a second impulse of compressed fluid at a pressure that corresponds to said quantity, furnishing the second component of said positioning impulse, a pressure summing device for each of said couplings to combine said components and issue a resultant impulse for positioning said valves to maintain the quantities of energized liquid in said couplings at a value which is necessary for transmitting the total power required to create the predetermined draft pressure and to equalize the quantities of the energized liquid in each of said couplings.

6. The combination according to claim 5 in which said pressure regulators are diaphragm operated and the second regulators are responsive to the level difference of the liquid in the respective two tanks.

7. In combination, a boiler furnace, several fans for creating draft therein, a variable speed hydraulic coupling for each fan, each coupling having a vaned runner fixed to a driven shaft connected to said fan, and an impeller attached to a driving shaft rotated by a prime mover of such constant speed and of such power that there is sufficient power for the maximum draft requirement a tank for each of said couplings communicating therewith, liquid in said couplings, energized by said impellers, a quantity of liquid in said tanks, pump means tending to convey liquid from said tanks into said couplings, separate increase- and decrease valves for regulating the flow of liquid therebetween, a first fluid pressure regulator responsive to said draft pressure and sending out a first impulse of compressed fluid at a pressure that corresponds thereto, one second fluid pressure regulator for each of said couplings responsive both to said first impulse and to the quantity of liquid in the respective tanks and sending out a second impulse of compressed fluid at a pressure corresponding to the resultant of both and positioning said valves suitably to maintain the quantities of energized liquid in said couplings at a value which is necessary for transmitting the total power required to create the predetermined draft pressure and to equalize the quantities of the energized liquid in each of said couplings.

8. The combination according to claim 7 in which said pressure regulators are diaphragm operated and the second regulators are responsive to the height of the level of the liquid in the respective tanks.

9. A control system for regulating the individual output of a plurality of fans operating in parallel, each fan being driven by a separate motor through a separate hydraulic coupling, each coupling being provided with a fluid reservoir, a pump, and piping for each tank and coupling whereby fluid may be circulated by each pump from its associated tank to its corresponding coupling and returned to its tank, said control system comprising means for adjusting the rate of flow of liquid from each tank to its associated coupling and from each coupling to its tank, thereby to regulate the quantity of fluid in each coupling and the power transmitted by it to its associated fan, and means responsive to variations in the relative quantities of liquid in said tanks for so adjusting the flow to and from couplings that the power transmitted thereby to their respective fans and the outputs of said fans are caused to bear predetermined relationships to each other.

GEORGE R. ANDERSON.